United States Patent [19]

Cusano et al.

[11] 4,230,510
[45] Oct. 28, 1980

[54] DISTRIBUTED PHOSPHOR SCINTILLATOR STRUCTURES

[75] Inventors: Dominic A. Cusano; Jerome S. Prener, both of Schenectady, N.Y.

[73] Assignee: General Electric Company, Schenectady, N.Y.

[21] Appl. No.: 853,086

[22] Filed: Nov. 21, 1977

[51] Int. Cl.² .............. G01T 1/164; C09K 11/08; B32B 31/12
[52] U.S. Cl. ............................. 156/67; 250/484
[58] Field of Search .......................... 156/67; 250/484

[56] References Cited

U.S. PATENT DOCUMENTS 3,855,035  12/1974  Bates .

Primary Examiner—James R. Hoffman
Attorney, Agent, or Firm—Alexander M. Gerasimow; James C. Davis; Marvin Snyder

[57] ABSTRACT

Distributed phosphor scintillator structures providing superior optical coupling to photoelectrically responsive devices together with methods for fabricating said scintillator structures are disclosed. In accordance with one embodiment of the invention relating to scintillator structures, the phosphor is distributed in a layered fashion with certain layers being optically transparent so that the visible wavelength output of the scintillator is better directed to detecting devices. In accordance with another embodiment of the invention relating to scintillator structures, the phosphor is distributed throughout a transparent matrix in a continuous fashion whereby emitted light is more readily transmitted to a photodetector. Methods for fabricating said distributed phosphor scintillator structures are also disclosed.

14 Claims, 8 Drawing Figures

U.S. Patent Oct. 28, 1980 Sheet 1 of 2 4,230,510
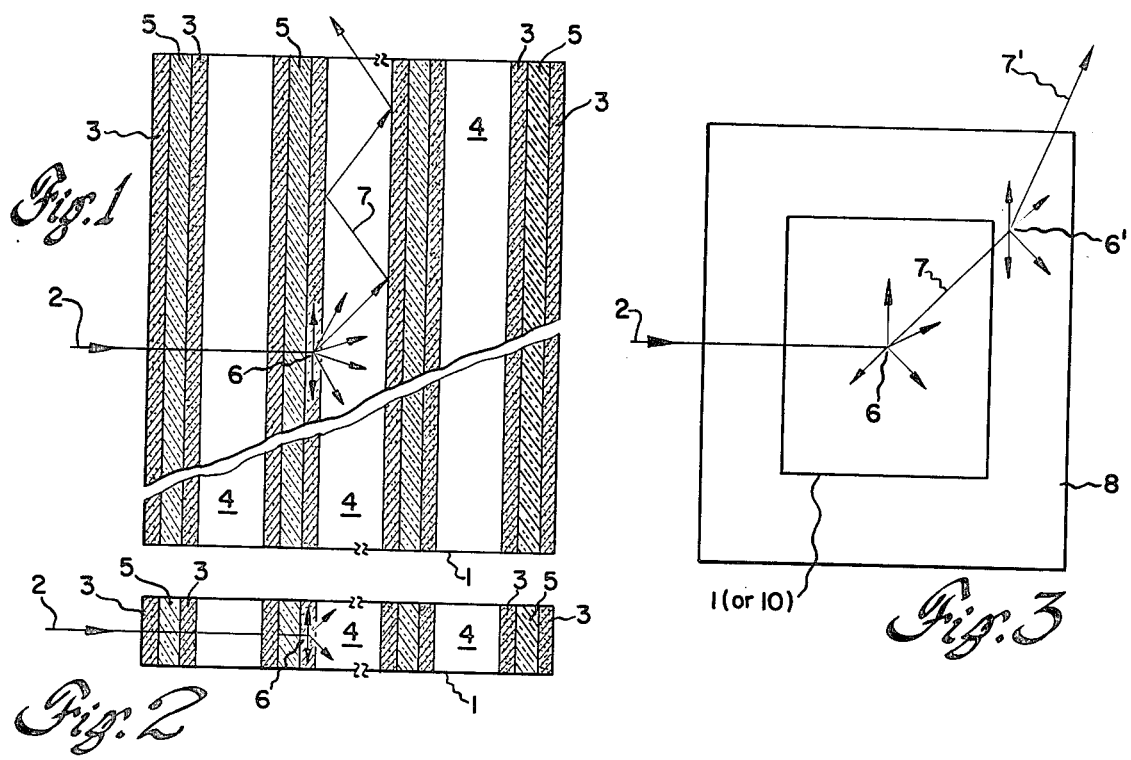
Fig.1
Fig.2
Fig.3
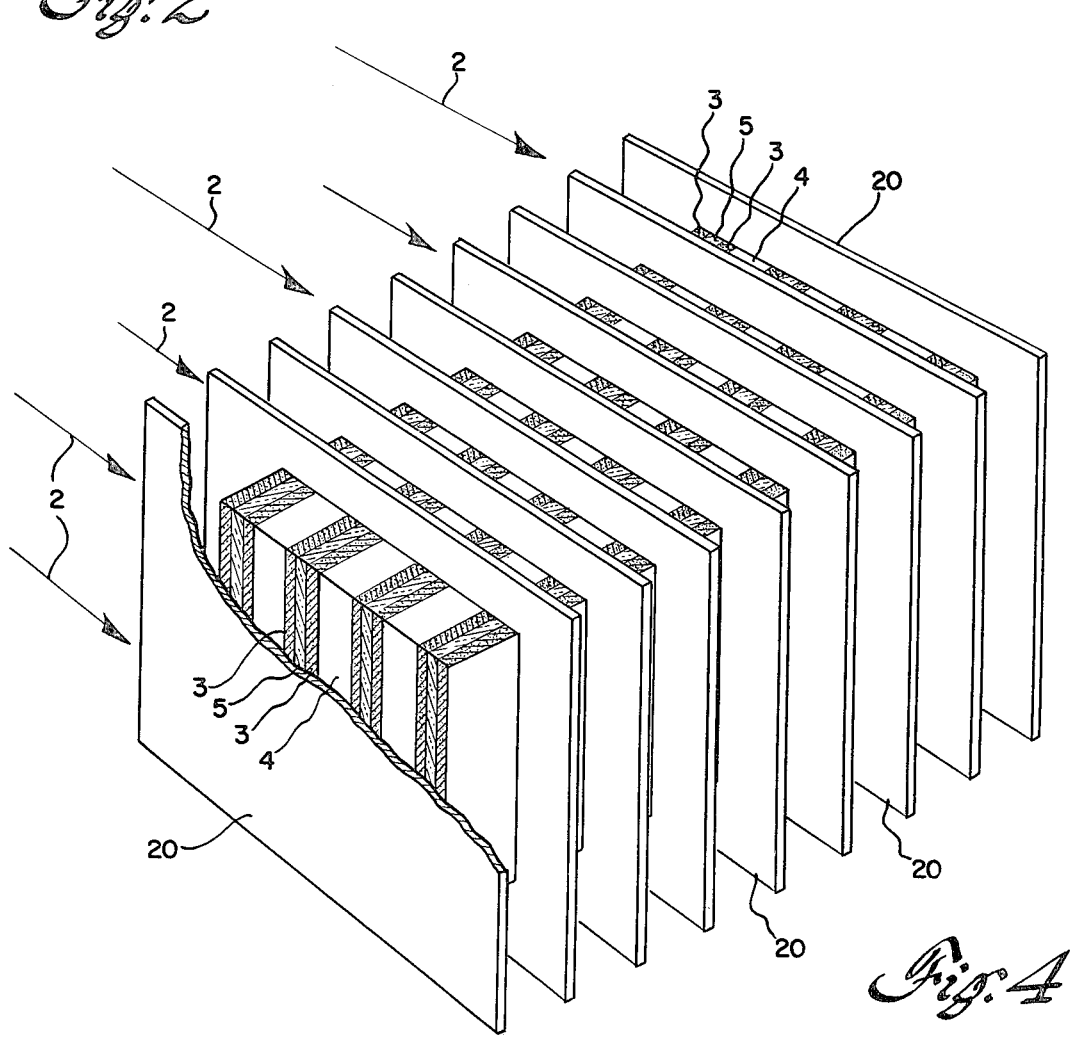
Fig.4

DISTRIBUTED PHOSPHOR SCINTILLATOR STRUCTURES

BACKGROUND OF THE INVENTION

This invention relates to scintillator structures and methods for fabricating such structures. More particularly, this invention relates to a method for distributing the scintillator phosphor in such a way as to enhance the escape of the visible wavelength radiation that would otherwise be dissipated within a scintillator body. Two embodiments of the present invention are disclosed: one in which the phosphor is distributed in a layered structure and another in which the phosphor is dispersed throughout a transparent matrix.

In general, a scintillator is a material which emits electromagnetic radiation in the visible or near-visible spectrum when excited by high energy electromagnetic photons such as those in the x-ray or gamma-ray regions of the spectrum, hereinafter referred to as supra-optical frequencies. Thus, these materials are excellent choices for use as detectors in industrial or medical x-ray or gamma-ray equipment. In most typical applications, the output from scintillator materials is made to impinge upon photoelectrically responsive materials in order to produce an electrical output signal which is directly related to the intensity of the initial x-ray or gamma-ray bombardment.

Scintillator materials comprise a major portion of those devices used to detect the presence and intensity of incident high energy photons. Another commonly used detector is the high pressure noble gas ionization device. This other form of high energy photon detector typically contains a gas, such as xenon, at a high pressure (density), which ionizes to a certain extent when subjected to high energy x-ray or gamma-ray radiation. This ionization causes a certain amount of current flow between the cathode and the anode of these detectors which are kept at relatively high and opposite polarities from one another. The current that flows in sensed by a current sensing circuit whose output is reflective of the intensity of the high energy radiation. Since this other form of detector operates on an ionization principle, after the termination of the irradiating energy there still persists the possibility that a given ionization path remains open. Hence, these detectors are peculiarly sensitive to their own form of "afterglow" which results in the blurring, in the time dimension, of information contained in the irradiating signal as a result of its passing through a body to be examined, as in computerized tomography applications.

As used herein and in the appended claims, the term "light" means those electromagnetic radiations in the visible region of the spectrum and also near-visible wavelengths given off by certain fluorescent materials. Also, as used herein, and in the appended claims, the term "optical" encompasses the same spectral region as the term "light" does.

In general, it is desirable that the amount of light output from these scintillators be as large as possible for a given amount of x-ray or gamma-ray energy. This is particularly true in the medical tomography area where it is desired that the energy intensity of the x-ray be as small as possible to minimize any danger to the patient.

Another important property that scintillator materials should possess is that of short afterglow or persistence. This means that there should be a relatively short period of time between the termination of the high energy radiating excitation and the cessation of light output from the scintillator. If this is not the case, there is resultant blurring, in time, of the information-bearing signal generated, for example, when the scintillator is used to produce tomographic imaging data. Furthermore, if rapid tomographic scanning is desired, the presence of the afterglow tends to severely limit the scan rate, thereby rendering difficult the viewing of moving bodily organs, such as the heart or lungs.

A scintillator body or substance, in order to be effective, must be a good converter of high energy radiation (that is, x-rays and gamma-rays). Typically, present scintillator bodies consist of a phosphor in a powder, polycrystalline, or crystalline form. In these forms, the useful light that is produced upon high energy excitation is limited to that which can escape the interior of the scintillator body and that generated in the surface regions. The escape of light is difficult due to the optical absorption resulting from multiple internal reflections, each such reflection further attenuating the amount of light availble to external detectors. Thus, it is necessary that not only the phosphors themselves have a good luminescent efficiency but it is also necessary that the light output be available for detection.

In the medical tomography area, where the intensity of x-radiation is modulated by the body through which it passes, and which modulated radiation is then converted into electrical signals, it is important to have x-ray detection devices which have a good overall energy conversion efficiency. For devices with low efficiency, a higher x-ray flux radiation must be applied to produce the same light and electrical output from the overall system. In a medical tomographic context, this means that such a system has a low signal-to-noise ratio.

Typical scintillator phosphors which are used include barium fluorochloride doped with a europium activator (BaFCl:Eu). Other phosphors, for example, include bismuth germanate ($Bi_4Ge_3O_{12}$), lanthanum oxybromide doped with terbium (LaOBr:Tb), cesium iodide doped with thalium (CsI:Tl), cesium iodide doped with sodium (CsI:Na), calcium tungstate ($CaWO_4$), cadmium tungstate ($CdWO_4$), zinc cadmium sulfide doped with silver (ZnCdS:Ag), zinc cadmium sulfide doped with silver and nickel (ZnCdS:Ag,Ni), gadolinium oxysulfide doped with terbium ($Gd_2O_2S$:Tb), and lanthanum oxybromide doped with dysprosium (LaOBr:Dy). Other host-crystal possibilities for phosphors include the selenides of zinc and cadmium, the tellurides of zinc and cadmium, sodium iodide (NaI), and the oxysulfide of lanthanum ($La_2O_2S$).

SUMMARY OF THE INVENTION

In accordance with one embodiment of the present invention, a suitable phosphor is attached to both sides of an underlying substrate. The phosphor is attached either in the form of a powder, in a more continuous form, or in a dispersed form in a transparent matrix. The resulting substrates with the phosphor material attached are further layered with one another and with a transparent material between the phosphorcoated substrates. This structure exposes a greater area of phosphor material to a region from which the light output from the material can easily escape to be detected. The resulting scintillator bodies are useful in tomographic detector arrays which require a high overall energy conversion efficiency for high resolution imagery and for patient safety.

In another embodiment of the present invention, the phosphor material is distribued in a continuous, rather than layered, fashion throughout a transparent matrix. Thus, the light that is produced upon x-ray or gamma-ray absorption deep within the scintillator body escapes from the body with a minimum amount of internal reflection and consequent light energy loss.

The phosphor material to be used in the above structure is inexpensive and the methods and other materials involved in fabricating the distributed phsophor scintillator structures are likewise inexpensive.

In particular, scintillator detector bodies are quite inexpensive when compared to ionization type x-ray detectors which typically consist of a highly pressurized (25 atmospheres) noble gas surrounding electrodes maintained at high opposite polarities from one another.

Accordingly, it is an object of this invention to provide inexpensive scintillator structures and methods of fabricating same in which there is a maximum detectable light output.

DESCRIPTION OF THE DRAWINGS

FIG. 1 is a side elevation sectional view of one embodiment of the present invention showing the phosphor distributed in a layered fashion.

FIG. 2 is a top sectional view of the scintillator body of FIG. 1 showing the phosphor distributed in a layered fashion.

FIG. 3 is a side elevation view of a scintillator body surrounded by a jacket which serves to convert the wavelength of the scintillator output to a more convenient wavelength.

FIG. 4 is a perspective view showing scintillator bodies with phosphor distributed in a layered fashion arranged as a portion of a tomographic x-ray detector.

DETAILED DESCRIPTION OF THE INVENTION

Figure 5:
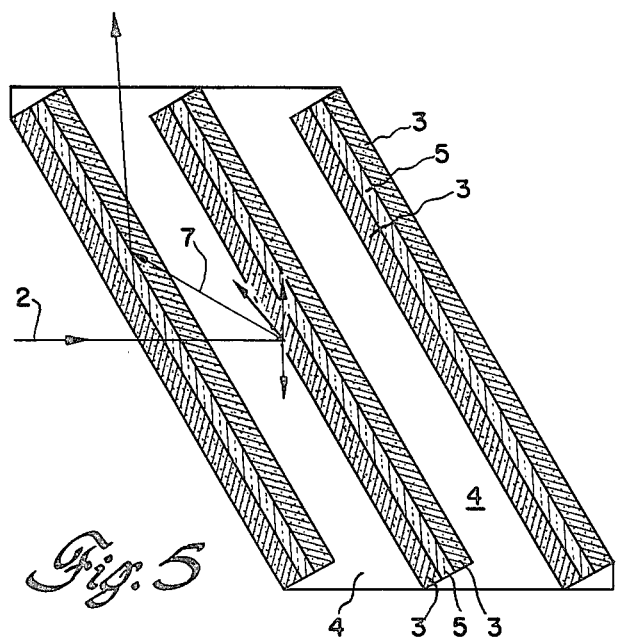
FIG. 5 is a side elevation sectional view of a layered scintillator structure tilted for greater absorption.

The invention herein relates to a distributed phosphor scintillator structure which produces a greater optical coupling between the scintillator body and the photoelectrically reponsive device, such as a photodiode, to which it is typically coupled. There are two primary embodiments of the present invention: one in which the phosphor is distributed in a layered fashion, which will be discussed first, and the other embodiment in which the phosphor is distributed in a continuous fashion throughout the scintillator body. It is to be noted, however, that sections of scintillator bodies with the phosphor distributed continuously throughout are in fact used in one embodiment of a multi-layered structure.

FIG. 1 shows a side elevation sectional view of a scintillator body 1 with a multi-layered structure. In this embodiment, phosphor material 3 is attached to a substrate 5. The phosphored substrates are further layered with light channeling laminates 4 between layers of phosphored substrates. FIG. 1 further shows an x-ray photon 2 being absorbed by a phosphor particle at an absorption site 6 in the fourth layer of the phosphor encountered. The absorption of the high energy, high frequency x-ray photon causes the production of a multitude of lower energy, lower frequency optical wavelength photons. The path 7 of a typical optical wavelength photon is shown as it is reflected back and forth within the light channeling laminate 4 between the phosphor layers, ultimately escaping the scintillator body whereby it may be more readily detected than if the absorption event had occurred deep withinside a dense and much less optically transparent body.

FIG. 2 shows a plan view of the same scintillator structure as shown in FIG. 1. It is to be noted that both FIG. 1 and FIG. 2 suggest that the number of phosphored substrate layers need not be fixed at four as shown.

FIG. 1 and FIG. 2 both illustrate a phosphor layer 3. In particular, this layer 3 applied to the substrate 5 is used in a variety of phosphor forms. The phosphor layer 3 consists of a phosphor either as a powder, as a single crystal, as a phosphor dispersed in a transparent matrix, or as a phosphor applied in a continuous layer, as for example, a phosphor material formed by a quench from its liquid form.

Any of the phosphors mentioned above are applicable to the substrate material with an appropriate adhesive and a suitable thickness. In particular, ZnCdS:Ag has a particularly large particle size which enhances the escape of light from the powder layer. The emission color of this particular phosphor is orange-red, which makes it well suited to detection by silicon semiconductor devices. A layer of 0.5 millimeters of this phosphor absorbs between 20 and 25 percent of the x-ray photons in a computerized tomography system in which the average x-ray energy is approximately 65 kev. Five or six layers of this thickness, for this phosphor, suffices to absorb 90 percent or more of the x-ray photons. When other more x-ray absorptive rare earth phosphors such as LaOBr:Tm, LaOBr:Tb, $Gd_2O_2S$:Tb, or $La_2O_2S$:Tb are employed, the number of layers to achieve the same total absorption is lower and losses in the light guiding laminate layers are also lower.

There are numerous choices for the phosphor material. The three criteria to be used in selecting a particular phosphor for computerized tomographic applications are its high luminescent efficiency, short afterglow duration, and low absorbance for the emitted light. The decay rate (afterglow) is particularly important in those medical tomographic applications where repeated scans are made, as for example, when dealing with images of moving bodily organs. Choices for host-crystal lattices to be doped with an appropriate rare earth element (that is, those elements with an atomic number between 58 and 71 inclusive) or other activator include the sulfides, selenides, and tellurides of zinc and cadmium, the iodides of sodium and cesium, the tungstates of calcium and cadmium, lanthanum oxybromide, and the oxysulfides of lanthanum and gadolinium.

In addition to applying the phosphor material to the substrate in a powder form, the phosphor material is also applicable as a single crystal when such crystals exist. For example, a single crystal of cesium iodide doped with thallium is attachable to the substrate with a suitable adhesive, such as an epoxy.

In another embodiment of the present invention, the phosphor layer which is attached to the substrate consists of an appropriate phosphor continuously dispersed in a transparent matrix such as that which is more particularly described below as an embodiment of the entire scintillator body. This particular layered embodiment combines features of both of the principal embodiments disclosed herein.

In another embodiment of the present invention, the phosphor layer 3 (FIG. 1) consists of a phosphor layer which is either evaporated onto the substrate, is melt solidified, high pressure sintered, or hot-forged. Such methods for producing these continuous phosphor layers are described in the copending application of Dominic A. Cusano, et al., Ser. No. 853,085 filed Nov. 21, 1977 which is assigned to the same assignee as the present invention.

The substrate material itself must be of a material which is not absorptive of x-rays whose frequencies are within the spectral region of interest. Typically, the substrate is composed of a clear fused quartz material. It is desirable that this substrate also be optically transparent although this is not essential since the majority of the optical photons emitted find their way to the outside through the light channeling laminate layers. A typical thickness for this substrate in a tomographic application is 20 mils.

Between each phosphored substrate, there is a layer of light channeling laminate material. Typically, this laminate is an epoxy. The principal criteria for selection of this laminate material is its optical transparency. Other criteria for its selection include its chemical compatibility with the phosphor material, its structural rigidity, its low x-ray absorptivity, and its ability to withstand prolonged x-ray bombardment.

The laminate layer also includes as a matter of choice, at least one wavelength conversion material such as a fluorescent dye which emits a visible wavelength photon at a wavelength susceptible to detection by the photoelectrically responsive sensing device when the wavelength conversion material itself is stimulated by the optical wavelength photons produced by the phosphor material. The intimate contact which the laminate layers have with the phosphored layers render them particularly useful and efficient for wavelength conversion.

If it is not desired that the wavelength conversion process take place within the scintillator body, then in another embodiment of the present invention, the scintillator body is surrounded by a jacket containing a wavelength conversion substance. This embodiment is illustrated in FIG. 3 wherein multilayered scintillator body 1 (or continuously dispersed phosphor scintillator body 10, described below) is surrounded by a jacket 8 containing suitable wavelength conversion material such as certain fluorescent dyes. In FIG. 3, x-ray photon 2 is absorbed at absorption site 6 within the scintillator body 1 as a result of which multiple photons at a first lower wavelength are emitted, said photon paths being illustrated by a typical photon path 7. Said photon traverses a typical path 7 to a secondary absorptive site 6' within the jacket 8 surrounding the scintillator body 1. At this site 6', the first wavelength photon is absorbed and another photon at a second wavelength is emitted traversing typical path 7'. In this fashion, the scintillator wavelength can be matched to a more sensitive spectral region of the photoelectrically responsive detector. If desired, several wavelength conversions may be made through the use of multiply matched fluorescent materials.

By way of example, the fabrication of a typical multilayered scintillator body is described. BaFCl:Eu phosphor is mixed with an equal weight of 1269A STYCAST® epoxy (supplied by Emerson and Cuming, Inc., of Canton, Mass.) containing rhodamine to the extent of 0.1 gm rhodamine per 30 ml of epoxy. The BaFCl Eu phosphor is typically doped with Eu to the extent of approximately 1 mole percent but doping to as low as 0.1 mole percent and as high as 5 mole percent is also used. The phosphor is suspended in epoxy by tumbling for 16 hours in a glass container containing glass beads. The suspension is doctor bladed onto 20 mil CFQ (clear fused quartz) substrates to a thickness of 20 mils using a Gardner doctor blade. The film is cured for 18 hours at 88° C. and the substrate is then coated on the other side and cured. A block scintillator material is made by laminating the phosphored substrate with 40 mil cured epoxy spacers using the same epoxy as a cement. In another embodiment of this invention, as described above, the organic dye rhodamine is incorporated in the epoxy spacers rather than in the phosphor itself.

There are a number of desirable features of this particular scintillator structure. For instance, the amount of x-ray radiation absorption is controlled by the number of layers of the phosphor. The number of layers is adjusted for the various absorptivity of the phosphors employed. If desired, certain substrates are coated with phosphor material on one side only. Another advantage of this structure is that it permits the use of phosphors other than the single crystal phosphors such as CsI:Tl. This structure permits much more flexible choices in the selection of an appropriate phosphor when such phospor properties as light output wavelength, short afterglow duration, and luminescent efficiency must be balanced. In addition, there are certain phosphors such as CsI:Na, which while otherwise being good phosphor materials, suffer from the problem that they are hygroscopic and when exposed in an atmospheric environment absorb water and suffer a resultant degradation in performance. This problem is much less severe in a layered structure in which the phosphor material has a minimal exposure to the atmosphere than it is when the phosphor is applied to an exposed imaging screen. Another feature of the scintillator body stemming from the structure of the present invention is its rigidity and ruggedness. A scintillator tomographic detector structure, such as that described in FIG. 4 does not suffer from the acoustic or microphonic noise pickup effects as do high pressure noble gas ionization type detectors. Moreover, the scintillator bodies are manufactured to a high degree of accuracy which enables them to be precisely aligned in a detector array such as that of FIG. 4. Moreover, the phosphor substrates may be angled as shown in FIG. 5 to produce a greater absorption without increasing the thickness of the phosphor on the substrate, thereby permitting, if desired, fewer layers to produce the same amount of absorption.

Figure 6:
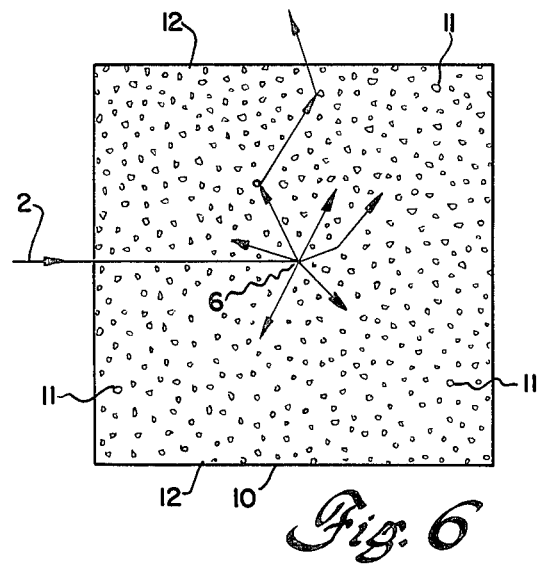
FIG. 6 is a side elevation sectional view of a scintillator body illustrating the continuous dispersion of phosphor throughout the body.

In accordance with the other principal preferred embodiment of the present invention, the phosphor material is dispersed in a continuous and uniform fashion throughout a transparent supportive matrix. FIG. 6 shows such a scintillator body 10 being stimulated by a high energy x-ray photon 2. In this configuration, phosphor particles 11 are suspended in a rigid transparent matrix 12. The high energy x-ray photon 2 is converted to light by absorption at absorption site 6 from which a multitude of lower energy optical wavelength photons are emitted. These photons are readily transmitted through the transparent matrix 12 being periodically reflected and scattered by the phosphor particles 11 which are also present. However, most of the resultant light energy produced eventually reaches the exterior of the scintillator body where it is detected. Such a typical light path 7 is shown in FIG. 6.

Figure 7:
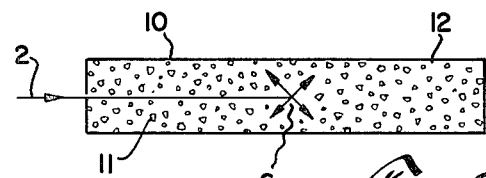
FIG. 7 is a top sectional view of the scintillator body of FIG. 6 also showing a continuous dispersion of phosphor material throughout the body.

FIG. 7 is a sectional plan view of FIG. 6 showing the absorption event produced by x-ray photon 2 within scintillator body 10. The principal requirements for the transparent matrix 12 are: that it be a good transmitter of light at the wavelength produced by the phosphor; that it not react with the phosphor; and that it maintain the phosphor in a fixed suspension after the phosphor is thoroughly dispersed throughout it. A number of plastics are appropriate for this purpose, such as the polyimide silicone copolymers.

In the embodiment described in FIG. 6, the particular choice of phosphor material is a matter of design consideration to be based on such factors as absorptivity, afterglow duration, luminescent efficiency, and output wavelength. However, the concentration of phosphor within the transparent (typically plastic) matrix is controlled to effect changes in the overall absorption. Typically, in this embodiment, the dispersed phosphor scintillator body consists of the phosphor in a concentration of 10 to 20 percent by volume.

Wavelength conversion is accomplished in the dispersed phosphor structure, if desired, in one of two ways. In accordance with one embodiment, the scintillator body is surrounded by a jacket containing a suitable wavelength converter such as the organic dye rhodamine. Such a structure is illustrated in FIG. 3 which is equally applicable to the dispersed phosphor structure as it is for the multilayered structure discussed above. In accordance with another embodiment of the invention, the wavelength conversion substance is mixed with the transparent matrix material.

Figure 8:
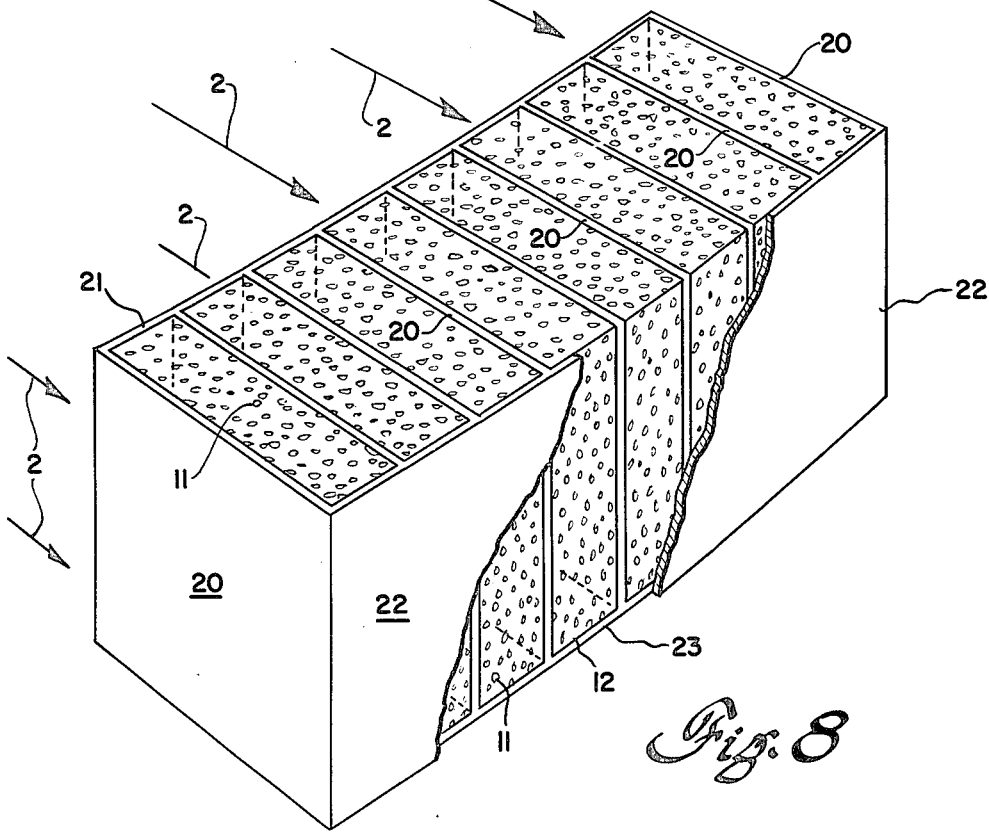
FIG. 8 shows a portion of a tomographic x-ray detector employing scintillator bodies with phosphor continuously distributed throughout.

The fabrication of dispersed phosphor scintillator bodies is particularly easy. The phosphor chosen is thoroughly mixed with an epoxy, plastic, or other polymer whose optical and chemical properties are not seriously affected by x-radiation and the resultant mixture is then solidified or if not actually solidified, the phosphor is fixed in suspension. The solidification is accomplished by a variety of processes including chemical activation, slight temperature elevation (curing), or ultraviolet irradiation. The scintillator bodies are produced either individually or en masse in a prefabricated detector array structure. FIG. 8 describes such a scintillator structure comprising a front wall member 21 composed of a low Z (atomic number) material, such as beryllium or aluminum, which is highly nonabsorptive for x-rays, collimator members 20 composed of a high Z material such as tungsten or tantalum which are relatively impervious to x-rays, a floor member 23, and a rear wall member 22. Detector members 20, 21, 22, and 23 define a series of volumes into which the dispersed phosphor material is inserted. To insure an adequate and thorough fill of this collimator structure, the entire detector assembly is agitated, typically at ultrasonic frequencies, during the insertion process. The material is then solidified either through chemical activation, curing, or by ultraviolet irradiation. This process results in an extremely rugged detector array which is much less susceptible to acoustic noise vibration during operation than is a typical ionization detector array. Again, a wavelength conversion material is added, if desired.

As with the multilayered structure, the dispersed phosphor structure is also rigid, rugged, and is easy to align accurately. The hygroscopic problem suffered by certain phosphor materials is also greatly reduced. In addition, the use of non-single crystal phosphor material is possible. Furthermore, the dispersed phosphor structure is not very sensitive to changes in the x-ray spectrum occurring as a result of any filtering effects of the matrix material.

Thus, it can be appreciated from the above that the principal preferred embodiments of the present invention describe scintillator structures with decided advantages over other scintillator structures and which in particularly greatly enhance the escape of light from the scintillator body.

While this invention has been described with reference to particular embodiments and examples, other modifications and variations will occur to those skilled in the art in view of the above teachings. Accordingly, it should be understood that within the scope of the appended claims, the invention may be practiced otherwise than is specifically described.

The invention claimed is:

1. A method of manufacturing multilayered scintillator bodies to increase detectable output at optical wavelengths when excited by high energy photons at supra-optical frequencies, said method comprising the steps of:
    (A) applying a uniform layer of phosphor material to at least one side of each of at least two rigid substrates, said substrates being inert, transparent to radiation at supra-optical frequencies, and having substantially flat sides; and then
    (B) forming a further layered structure by disposing an optically transparent material between layers of the phosphored substrates from step A, said laminate material being transparent to radiation at supra-optical frequencies, whereby optical wavelength output produced within the scintillator body is channeled to the exterior of the body for detection.

2. The method of claim 1 in which, in step A, the phosphor material is applied to the substrates by doctor blading.

3. The method of claim 1 in which, in step B, the optically transparent material is applied to the phosphored substrates by doctor blading, said optically transparent material being in unhardened form, and then after step B, causing the material to harden.

4. The method of claim 3 in which at least one wavelength conversion substance is added to the unhardened optically transparent material before said material is applied to the phosphored substrate, whereby the optical output of the phosphor is matched to the spectral response of a photoelectrically responsive detector.

5. The method of claim 1 in which at least one wavelength conversion substance is added to the phosphor before application of the phosphor to the substrate, whereby the optical output of the phosphor is matched to the spectral response of a photoelectrically responsive detector.

6. The method of claim 1 in which the optically transparent material comprises an epoxy resin.

7. The method of claim 1 in which the substrate is quartz.

8. The method of claim 1 in which the phosphor layer applied is a single crystal.

9. The method of claim 1 in which the phosphor layer applied is in powder form.

10. The method of claim 1 in which the phosphor layer is applied onto the substrate by an evaporation process.

11. The method of claim 1 in which the phosphor layer applied is made by high pressure sintering.

12. The method of claim 1 in which the number of layers formed is controllably selected and angled to produce a desired amount of absorption of said high energy photons, whereby the absorption is controlled independently of the absorption of the phosphor material itself.

13. The method of claim 1 in which the phosphor is selected from the group consisting of BaFCl:Eu, ZnCdS:Ag, ZnCdS:Ag,Ni, CsI:Tl, CsI:Na, CaF$_2$:Eu, Gd$_2$O$_2$S:Tb, LaOBr:Dy, LaOBr:Tm, LaOBr:Tb, La$_2$O$_2$S:Tb, Bi$_4$Ge$_3$O$_{12}$, CaWO$_4$, ZnS, ZnSe, ZnTe, CdS, CdSe, CdTe, and NaI.

14. The scintillator body produced in accordance with the method of claim 1.

* * * * *